Patented Oct. 17, 1922.

1,431,937

UNITED STATES PATENT OFFICE.

HENRY V. DUNHAM, OF MOUNT VERNON, NEW YORK, ASSIGNOR TO DRY OIL PRODUCTS LIMITED, OF LONDON, ENGLAND, A COMPANY OF GREAT BRITAIN.

CASEIN-OIL COMPOSITION AND PROCESS OF MAKING SAME.

No Drawing. Application filed September 20, 1919, Serial No. 325,226. Renewed March 4, 1922. Serial No. 541,194.

*To all whom it may concern:*

Be it known that I, HENRY V. DUNHAM, a citizen of the United States, residing at Mount Vernon, in the county of Westchester and State of New York, have invented certain new and useful Improvements in Casein-Oil Composition and Process of Making Same, of which the following is a specification.

The present invention relates to the production of a composition comprising an intimate mixture of casein and oil, which material is suitable for use in cooking and for other purposes.

In my prior Patents Numbers 1,302,486 and 1,302,487, dated April 29, 1919, I have described and claimed the production of emulsifiable mixtures containing as their essential constituent a homogenized and dried emulsion of oil in a solution of alkali casein. Such dry compositions have the property that when they are mixed with water, the alkali-casein compound dissolves and there is produced an intimate and relatively stable emulsion of the oil. Such materials are sometimes highly suitable for use in cooking operations, but in some cases they do not work well in those cooking operations where baking powder is used. This seems to be on account of the fact that the alkali casein reacts with the acid constituents of the baking powder, or with the carbon dioxid as produced from the baking powder so that light raised products produced by the use of baking powder cannot readily be obtained, without the use of substantially larger amounts of baking powder than are ordinarily used.

In accordance with the present invention I produce a dry pulverulent material which can be mixed with flour and sifted if desired, and baking powder added to the mixture, after which, upon the addition of water, or liquids containing water, carbon dioxid of the baking powder produces the raising to give the desired lightness of the product.

As a specific example of the process embraced within the present invention, the following is given for the purpose of illustration, and not as restricting the invention thereto:

Ordinary commercial casein is dissolved in water with the aid of an alkali, as in my prior application. For example, there may be used 100 pounds of casein; 9 pounds of bicarbonate of soda and 400 pounds of water. This mixture is heated and agitated until the casein is dissolved or substantially completely dissolved and the mixture may then be filtered, if desired or if necessary. The liquid may then be diluted with water to somewhat reduce the viscosity, if desired, for this purpose 200 pounds of water may be added. To this mixture there is added an ingestible oil in proportions to meet the requirements of the particular product. The proportion of oil may be as low as 5 to 10%, or it may be as high as 300% (or even more) of the weight of the dry casein used. Thus, with the above batch of material I might add 5 to 10 pounds of cocoanut oil or in other instances I might use even up to 300 pounds of cocoanut oil. 200 pounds of the oil gives good results, and this may be considered as a moderate amount for making a shortening material. The liquid is, of course, at the time of adding the oil, maintained at above the melting temperature of the oil, when solid oils or fats are added. After the oil is added, it is thoroughly agitated to produce an emulsion and the emulsion is then passed through a homogenizer to produce a very complete and thoroughly homogenized emulsion of the oil in the casein alkali solution. The mixture at this stage may be either warm or cold and if warm, I preferably cool the mixture to about room temperature before proceeding further.

To the cold mixture of casein, oil and water there is added an acid material, for example hydrochloric acid, in amount sufficient to precipitate or partially precipitate the casein from the casein-alkali compound or in other words, preferably enough acid material is added to curdle the mixture. In some cases it may be desired to only neutralize or very slightly acidify the casein present in the mixture, which would leave the free casein and oil in the form of an intimate emulsion somewhat resembling milk or homogenized milk. The resulting precipitate is in a very fine condition and may be then separated from the aqueous liquid by filtration or by straining through a fine cloth, such as cotton sheeting. The precipitate is then dried in any convenient manner without overheating and is then ready for packaging and shipment. In another modification, the mixture of fine precipitated casein and intermixed liquid may be dried together, for example, on a double revolving cylinder drier, such as a Just milk drier. In this example, the product will contain sodium chloride in addition to the casein oil mixture.

When an excess of acid or other precipitating agent is added to the homogenized liquid and the casein is precipitated, the oil is thrown out with the precipitate in the form of an extremely intimate mixture of the casein and oil. In the above example, I have mentioned cocoanut oil as being suitable. It will be understood that various other oils or fats can be employed, for example, olive oil, nut oil, cotton-seed oil, soya bean oil, peanut oil, fish oil, castor oil, cod liver oil, oleo, lard, tallow or mixtures thereof, and these materials may have previously been subjected to any desired purification operation, if desired, or to partial hydrogenation sufficient to increase their viscosity, if desired, and to remove undesirable flavor or odor.

In some other cases, it is not necessary to add the acid or acid salt or other casein-precipitant in such large amounts as is contemplated in the above example. If the liquid be made only very feebly acid, the casein-alkali compound may be decomposed and the casein set free in an extremely minutely divided state, which does not agglomerate nor settle on standing for several hours, the free casein existing in a condition somewhat similar to that in which casein exists in milk, with the very minute oil or fat particles thoroughly mixed therewith. The casein, or a part of it, seems to be in a condition approaching the colloidal state. Such a product can be dried on a milk-drying machine, and the resulting product can be mixed up with water to produce a smooth relatively stable emulsion. When medicinal oils are employed, a convenient form of administering the same is thereby afforded. In some cases the product of this modification of the process would be a more suitable way of administering medicinal oils (e. g. castor, cod liver, etc.) than that described and claimed in my patents above referred to. It is to be understood that other materials as noted in the prior cases (medicinal agents, flavoring or seasoning materials etc.) may be added at any stage prior to the final drying, or in some instances after drying. It is to be understood that there are certain diseases or disorders in which an alkali-casein compound (particularly if the same is to be taken by the patient for a long period) would be regarded by physicians as objectionable. This dried product may also be used as a substitute for dried milk.

In the operation of slightly acidifying, as described in the preceding paragraph, if the acid used is a relatively concentrated mineral acid, and it is added without constant stirring of the mass, some lumps of the curd may be formed. These, however, will usually be soft and readily broken up by agitation of the mass, or by rubbing between the fingers, or by the employment of an equivalent mechanical device. In some cases, after the acidification of the mixture, and before drying, the entire mixture may again be passed through a homogenizer.

During the homogenizing operations any desired pressure can be employed, depending upon the particular material under treatment. With ordinary mixtures a pressure of from 3500 to 6000 pounds may be conveniently employed.

The drying operation should be conducted in such a manner as not to injure the product. The drying may be conducted in a vacuum, if desired.

After the drying operation has been completed, it may be necessary or advisable to pass the mixture through a suitable grinding mill, or other comminuting device, to reduce the same to extremely fine powder, and to break up any lumps contained therein.

The product of the process is relatively stable and (unless the particular oil used is highly unstable) will keep for months in relatively air-tight containers, such as paraffined cartons.

It is to be understood that after the original emulsion of the alkali casein and oil is made, especially when relatively large amounts of oil are incorporated, and the mixture slightly acidified, there is no curdling of the entire mixture, the casein is merely rendered insoluble and a mixture resembling milk or even homogenized milk is produced. Such a mixture does not settle or separate into two layers, to any great extent, even if allowed to stand for several hours. The particles of oil and of casein, in complete suspension therein, are held thoroughly mixed with the liquid. If it is desired to throw down a curd for filtration and drying, then it is best to add a considerable excess of acid.

It is further to be understood that while I have referred to acids, for the precipitating or insolubilizing agent, acid salts (e. g. sodium bisulfate or sodium monophosphate) could also be used to replace all or a part of the free acid. Also other agents capable of rendering the casein insoluble, not only inorganic acids or acid salts, but also organic acid materials, and other organic or inorganic materials which are capable of precipitating the casein from alkali-casein compounds whether such materials throw down the casein as a curd or only precipitate (render insoluble) the casein in a finely divided state in which it does not readily settle.

Examples of such materials are calcium chlorid, magnesium chlorid, calcium butyrate etc. in some instances formaldehyde.

I am aware that emulsions of halogenated oils in milk or other liquids containing casein have heretofore been proposed, and it has been proposed to dry such emulsions. I make no claim to any treatment of halogenated oil products.

I claim:

1. A process which comprises the step of adding an acid to a homogenized emulsion containing alkali-casein and an ingestible oil, in amount at least sufficient to neutralize the alkalinity.

2. A process which comprises adding an acid to a homogenized emulsion of alkali-casein and an ingestible oil, in amount at least sufficient to neutralize the alkalinity separating the precipitate from the supernatant liquid and thereafter drying the precipitate.

3. A product comprising a precipitated casein containing, intimately incorporated therewith, an ingestible oil, said product being capable, on mixing with water, of giving a relatively stable emulsion.

4. A dry, pulverulent, intimate association of precipitated casein and ingestible oil, substantially as described.

5. The process which comprises homogenizing an amulsion of alkali-casein and an ingestible oil, and adding an agent capable of precipitating casein.

6. A process which comprises adding to a homogenized emulsion containing alkali-casein and an ingestible oil, an agent capable of rendering the casein insoluble in the liquid, and drying the resulting mixture.

In testimony whereof I affix my signature.

HENRY V. DUNHAM.